United States Patent
Frank et al.

(10) Patent No.: US 6,851,462 B2
(45) Date of Patent: Feb. 8, 2005

(54) RUBBER COMPOSITIONS CONTAINING A CYCLODEXTRIN COMPOUND

(75) Inventors: Uwe Ernst Frank, Marpingen (DE); Francois Kayser, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 43 days.

(21) Appl. No.: 10/266,042

(22) Filed: Oct. 7, 2002

(65) Prior Publication Data

US 2003/0083404 A1 May 1, 2003

Related U.S. Application Data

(60) Provisional application No. 60/339,853, filed on Oct. 30, 2001.

(51) Int. Cl.$^7$ ............................... B60C 5/00; B60C 9/00
(52) U.S. Cl. ........................ 152/450; 152/451; 152/525; 428/34.1; 428/35.7; 524/502; 525/54.31
(58) Field of Search ................................. 152/450, 451, 152/525; 428/34.1, 35.7; 524/502; 525/54.31

(56) References Cited

U.S. PATENT DOCUMENTS

| | | | |
|---|---|---|---|
| 4,356,115 A | 10/1982 | Shibanai et al. | ............ 252/522 |
| 4,357,468 A | 11/1982 | Szejtli et al. | ................ 536/56 |
| 4,636,343 A | 1/1987 | Shibanai | ..................... 264/118 |
| 4,677,177 A | 6/1987 | Shibanai et al. | ............ 527/300 |
| 4,681,934 A | 7/1987 | Shibanai et al. | .............. 536/46 |
| 4,711,936 A | 12/1987 | Shibanai et al. | ............ 525/485 |
| 4,722,815 A | 2/1988 | Shibanai | ..................... 264/117 |
| 5,001,176 A | 3/1991 | Nakazima | .................... 524/48 |
| 5,177,129 A | 1/1993 | Bobo, Jr. | ..................... 524/48 |
| 5,262,404 A | 11/1993 | Weisz et al. | .................. 514/58 |
| 5,776,842 A | 7/1998 | Wood | ........................ 442/394 |

FOREIGN PATENT DOCUMENTS

| | | | | |
|---|---|---|---|---|
| JP | 61-111343 | * | 5/1986 | |
| JP | 62-173304 | * | 7/1987 | |
| JP | 63218063 | | 9/1988 | ........... B65D/65/38 |
| JP | 63237932 | | 10/1988 | ............ B29D/7/01 |
| JP | 3100065 | | 4/1991 | ......... C08L/101/00 |
| JP | 4108523 | | 4/1992 | ........... B01D/71/08 |

OTHER PUBLICATIONS

"Cyclodextrin Inclusion Compounds in Research and Industry" by W. Saenger as published in *Angew. Chem. Int. Ed. Engl.* vol. 19, (1980), pp. 314 through 362.

* cited by examiner

*Primary Examiner*—Ana Woodward
(74) *Attorney, Agent, or Firm*—John D. DeLong

(57) ABSTRACT

There is disclosed a rubber composition comprising:
(A) 100 parts by weight of at least one rubber containing olefinic unsaturation; and
(B) 1.5 to 50 phr of a cyclodextrin compound.

20 Claims, No Drawings

RUBBER COMPOSITIONS CONTAINING A CYCLODEXTRIN COMPOUND

The Applicants hereby incorporate by reference prior U.S. Provisional Application Ser. No. 60/339,853, filed on Oct. 30, 2001.

BACKGROUND OF THE INVENTION

Cyclodextrin materials and substitute cyclodextrin materials are known. A major use of cyclodextrin materials is in formation of an inclusion complex for the delivery of an inclusion compound. The cyclodextrin material has a hydrophobic interior pore that is ideal for complexing a variety of organic compounds. Unmodified cyclodextrin inclusion complex materials have been used in films, see Japan Patent Application No. 63-237932 and Japanese Patent Application No. 63-218063. The use of cyclodextrin inclusion compounds is discussed in detail in "Cyclodextrin Inclusion Compounds in Research and Industry", Willfrom Saenger, Angew. Chem. Int. Ed. Enql., Volume 19, Pages 344 through 362 (1980). The cyclodextrin inclusion compounds are used in a variety of delivery applications. Materials including deodorants, antibacterial materials, antistatic agents, eatable oils, insecticides, fungicides, deliquescent substances, corrosion inhibitors, flavor enhancing compounds, pyrethroids, pharmaceutical and agricultural compounds, etc. can be delivered. Such applications are disclosed in a variety of patents. Exemplary patents include Shibani et al., U.S. Pat. Nos. 4,356,115; 4,636,343; 4,677,177; 4,681,934; 4,711,936; 4,722,815; and others. Yashimaga, JP 4-108523, teaches a permselective membrane used for separation of chiral compounds using a polyvinyl chloride film containing high loadings of a substituted cyclodextrin and a plasticizer. Yoshenaga, JP 3-100065, uses an unsubstituted cyclodextrin in a film layer. Nakazima, U.S. Pat. No. 5,001,176; Bobo Jr. et al., U.S. Pat. No. 5,177,129; and others use cyclodextrin materials to act as an inclusion complex for film stabilizing components. Zejtli et al., U.S. Pat. No. 4,357,468 shows one specific application of the use of cyclodextrin materials as servants in separation techniques. The particular cyclodextrin material is a polyoxyalkylene substituted material used in separation schemes.

SUMMARY OF THE INVENTION

The present invention relates to rubber compositions containing cyclodextrin compounds.

DETAILED DESCRIPTION OF THE INVENTION

There is disclosed a rubber composition comprising:
(A) 100 parts by weight of at least one rubber containing olefinic unsaturation; and
(B) 1.5 to 50 phr of a cyclodextrin compound.

In addition, there is disclosed a pneumatic tire having a rubber component when the rubber in said component is comprised of
(A) 100 parts by weight of at least one rubber containing olefinic unsaturation; and
(B) 1.5 to 50 phr of a cyclodextrin compound.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The present invention contains a cyclodextrin or a substituted or derivatized cyclodextrin compatible with the rubber. For this invention, compatible means that the cyclodextrin material can be uniformly dispersed into the rubber. Compatibility can be determined by measuring rubber characteristics such as tensile strength, tear resistance, etc.

Cyclodextrin is a cyclic oligosaccharide consisting of at least five, preferably at least six glucopyranose units joined by α(1→4) linkages. Although cyclodextrin with up to twelve glucose residues are known, the three most common homologies (α-cyclodextrin, β-cyclodextrin and γ-cyclodextrin) having six, seven and eight residues have been used.

Cyclodextrin is produced by a highly selective enzymatic synthesis. They consist of six, seven or eight glucose monomers arranged in a torus or donut shaped ring, which are denoted α-, β- or γ-cyclodextrin respectively. The specific coupling of the glucose monomers gives the cyclodextrin a rigid, truncated conical molecular structure with a hollow interior of a specific volume. This internal cavity, which is lipophilic (i.e., is attractive to hydrocarbon materials in aqueous systems and is hydrophobic) when compared to the exterior, is a key structural feature of the cyclodextrin, providing the ability to the hydrocarbon portion of complex molecules (e.g., aromatics, alcohols, alkyl halides and aliphatic halides, carboxylic acids and their esters, etc.). The complexed molecule must satisfy the size criterion of fitting at least partially into the cyclodextrin internal cavity, resulting in an inclusion complex.

The oligosaccharide ring forms a torus, that can be visualized as a truncated cone, with primary hydroxyl groups of each glucose residue lying on a narrow end of the torus. The secondary glucopyranose hydroxyl groups are located on the wide end. The parent cyclodextrin molecule, and useful derivatives, can be represented by the following formula (the ring carbons show conventional numbering) in which the vacant bonds represent the balance of the cyclic molecule:

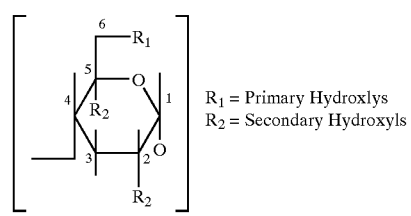

$R_1$ = Primary Hydroxlys
$R_2$ = Secondary Hydroxyls

I wherein $R_1$ and $R_2$ are primary or secondary hydroxyl as shown.

Cyclodextrin molecules have available for reaction with a chemical reagent the primary hydroxyl at the six position, of the glucose moiety, and at the secondary hydroxyl in the two and three position. Because of the geometry of the cyclodextrin molecule, and the chemistry of the ring substituents, all hydroxyl groups are not equal in reactivity. However, with care and effective reaction conditions, the cyclodextrin molecule can be reacted to obtain a derivatized molecule having all hydroxyl groups derivatized with a single substituent type. Such a derivative is a persubstituted cyclodextrin. Cyclodextrin with selected substituents (i.e.) substituted only on the primary hydroxyl or selectively substituted only at one or both the secondary hydroxyl groups can also be synthesized if desired. Further directed synthesis of a derivatized molecule with two different substituents or three different substituents is also possible. These substituents can be placed at random or directed to a specific hydroxyl. For the purposes of this invention, the cyclodextrin molecule needs to contain sufficient compatible substituent groups on the molecule to insure that the cyclodextrin material can be uniformly dispersed into the rubber.

Apart from the introduction of substituent groups on the CD hydroxyl other molecule modifications can be used. Other carbohydrate molecules can be incorporated into the cyclic backbone of the cyclodextrin molecule. The primary hydroxyl can be replaced using $SN_2$ displacement, oxidized dialdehyde or acid groups can be formed for further reaction with derivatizing groups, etc. The secondary hydroxyls can be reacted and removed leaving an unsaturated group to which can be added a variety of known reagents that can add or cross a double bond to form a derivatized molecule. Further, one or more ring oxygen of the glycan moiety can be opened to produce a reactive site. These techniques and others can be used to introduce compatibilizing substituent groups on the cyclodextrin molecule.

The preferred preparatory scheme for producing a derivatized cyclodextrin material having a functional group compatible with the rubber involves reactions at the primary or secondary hydroxyls of the cyclodextrin molecule. A broad range of pendant substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphato cyclodextrin, imidazolyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well known groups. The formation of such groups on either the primary or secondary ring hydroxyls of the cyclodextrin molecule involve well known reactions. The acylation reaction can be conducted using the appropriate acid anhydride, acid chloride, and well known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin. Alkylating groups can be used to produce peralkylated cyclodextrin using sufficient reaction conditions exhaustively react available hydroxyl groups with the alkylating agent. Further, depending on the alkylating agent, the cyclodextrin molecule used in the reaction conditions, cyclodextrin substituted at less than all of the available hydroxyls can be produced. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl) mesyl (methane sulfonyl) or other related alkyl or aryl sulfonyl forming reagents can be used in manufacturing compatibilized cyclodextrin molecules for use in thermoplastic resins. The primary —OH groups of the cyclodextrin molecules are more readily reacted than the secondary groups. However, the molecule can be substituted on virtually any position to form useful compositions.

Such sulfonyl containing functional groups can be used to derivatized either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyl. The sulfonyl chloride is used at appropriate mole ratios depending on the number of target hydroxyl groups in the molecule requiring substitution. Both symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, mono-substituted cyclodextrin can be made wherein a single glucose moiety in the ring contains between one and three sulfonyl substituents. The balance of the cyclodextrin molecule remaining unreacted.

Amino and other azido derivatives of cyclodextrin having pendent rubber containing moieties can be used in the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents, halogen derivatives of cyclodextrin can be manufactured as a feed stock for the manufacture of a cyclodextrin molecule substituted with a compatibilizing derivative. In such compounds the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphate groups. The 2, and 3, secondary hydroxyls can be branched using an alkyl phosphate group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxylethyl and corresponding oxime isomers, formyl methyl and its oxime isomers, carbylmethoxy (—O—CH$_2$—CO$_2$H), carbylmethoxymethyl ester (—O—CH$_2$CO$_2$—CH$_3$). Cyclodextrin with derivatives formed using silicone chemistry can contain compatibilizing functional groups.

Cyclodextrin derivatives with functional groups containing silicone can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are preferred including trimethylsilyl, mixed methyl-phenyl silyl groups, etc. Certain β-CD and acetylated and hydroxy alkyl derivatives are available from American Maize Products Co. (now Cerestar USA), Corn Processing Division, Hammond, Ind., or from Wacker Chemie GmbH, Germany, under the designations Cavamex™ and Cavasol™.

The amount of cyclodextrin of formula I in the rubber may vary. For example, from 1.5 to 50 phr may be used. Preferably, from 8 to 45 phr is present in the rubber.

The rubber composition may additionally contain a conventional sulfur containing organosilicon compound. Examples of suitable sulfur containing organosilicon compounds are of the formula:

$$Z-Alk-S_n-Alk-Z \qquad (II)$$

in which Z is selected from the group consisting of

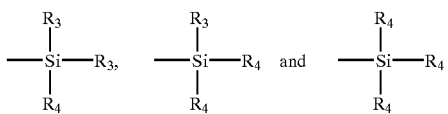 and 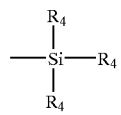

where $R_3$ is an alkyl group of 1 to 4 carbon atoms, cyclohexyl or phenyl; $R_4$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl)disulfide, 3,3'-bis (triethoxysilylpropyl)tetrasulfide, 3,3'-bis (triethoxysilylpropyl)octasulfide, 3,3'-bis (trimethoxysilylpropyl)tetrasulfide, 2,2'-bis (triethoxysilylethyl)tetrasulfide, 3,3'-bis (trimethoxysilylpropyl)trisulfide, 3,3'-bis (triethoxysilylpropyl)trisulfide, 3,3'-bis (tributoxysilylpropyl)disulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, 3,3-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricycloethoxysilylpropyl)tetrasulfide, 3,3'-bis (tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3 '-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis (trimethoxysilylbutyl)tetrasulfide, 6,6'-bis (triethoxysilylhexyl)tetrasulfide, 12,12'-bis (triisopropoxysilyl dodecyl)disulfide, 18,18'-bis (trimethoxysilyloctadecyl)tetrasulfide, 18,18'-bis (tripropoxysilyloctadecenyl)tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide, 3,3'-bis (dimethoxyphenylsilyl-2-methylpropyl)disulfide.

The preferred sulfur containing organosilicon compounds are the 3,3'-bis(trimethoxy or triethoxy silylpropyl) sulfides. The most preferred compounds are 3,3'-bis (triethoxysilylpropyl)disulfide and 3,3'-bis (triethoxysilylpropyl) tetrasulfide. Therefore as to formula II, preferably Z is where $R_4$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of Formula II in a rubber composition will vary depending on the level of other additives that are used. Generally speaking, the amount of the compound of formula II will range from 0.5 to 20 phr. Preferably, the amount will range from 1 to 10 phr.

In the rubber of the present invention, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and cyclodextrin are mixed in one or more non-productive mix stages. The terms "non-productive" and "productive" mix stages are well known to those having skill in the rubber mixing art. The cyclodextrin may be added as a separate ingredient or in the form of a masterbatch. The rubber composition containing the cyclodextrin as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

One feature of the cyclodextrin may be their solubility in organic solvents. This feature offers the opportunity to incorporate such cyclodextrin into the elastomers via a number of ways aside from mechanical working in a mixer or extruder. For example, it is contemplated that one can disperse or dissolve the cyclodextrin in a polymer cement (elastomer solubilized in an organic solvent) with mixing and removal of the solvent to yield a uniformly dispersed cyclodextrin in the elastomer. In accordance with another embodiment, one can solubilize the cyclodextrin in the organic solvent along with the monomer or monomers for subsequent solution polymerization. Under this embodiment, the monomers polymerize to form the elastomer in the cyclodextrin media.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in a sidewall and/or the tread of a tire. As can be appreciated, the tire may be a passenger tire, aircraft tire, truck tire and the like. Preferably, the tire is a passenger tire. The tire may also be a radial or bias, with a radial tire being preferred.

The rubber composition containing the cyclodextrin and rubber containing olefinic unsaturation may be incorporated in a variety of rubber components of the tire. For example, the rubber component may be a tread (including tread cap and tread base), sidewall, apex, chafer, sidewall insert, inner liner, wirecoat and ply coat. Preferably, the compound is the tread. Such tires can be built shaped molded and cured by various methods which are known and are readily apparent to those having skill in such art.

The pneumatic tire of the present invention may be a passenger tire, motorcycle tire, aircraft tire, agricultural, earthmover, off-the-road, truck tire and the like. Preferably, the tire is a passenger or truck tire. The tire may also be a radical or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

Upon vulcanization of the sulfur vulcanized composition, the rubber composition of this invention can be used for various purposes other than a tire. For example, the sulfur vulcanized rubber composition may be in the form of a belt or hose.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component where the rubber composition in said component is comprised of
   (A) 100 parts by weight of at least one olefinically unsaturated rubber;
   (B) 1.5 to 50 phr of a cyclodextrin compound; and
   (C) 0.5 to 20 phr of a sulfur containing organosilicon compound of the formula:

in which Z is selected from the group consisting of

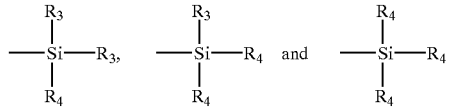

where $R_3$ is an alkyl group of 1 to 4 carbon atoms, cyclohexyl or phenyl; $R_4$ is alkoxy of 1 to 8 carbon atoms, or cycloalkoxy of 5 to 8 carbon atoms; Alk is a divalent hydrocarbon of 1 to 18 carbon atoms and n is an integer from 2 to 8.

2. The pneumatic tire of claim 1 wherein the cyclodextrin compound comprises a cyclodextrin compound having at least one pendent moiety or substituent that renders the cyclodextrin compatible with the rubber.

3. The pneumatic tire of claim 1 wherein the cyclodextrin compound contains at least one substituent on a cyclodextrin primary carbon atom.

4. The pneumatic tire of claim 1 wherein the cyclodextrin comprises α-cyclodextrin, β-cyclodextrin, γ-cyclodextrin or mixtures thereof.

5. The pneumatic tire of claim 1 wherein said cyclodextrin compound is selected from the group consisting of acylated cyclodextrin, alkylated cyclodextrin, cyclodextrin esters, hydrocarbyl-amino cyclodextrin, alkyl phosphono cyclodextrin, alkyl phosphato cyclodextrin, imidazolyl substituted cyclodextrin, pyridine substituted cyclodextrin, hydrocarbyl sulfur containing functional groups cyclodextrin, silica-containing functional group substituted cyclodextrin, carbonate substituted cyclodextrin, carboxylic acid substituted cyclodextrin and mixtures thereof.

6. The pneumatic tire of claim 1 wherein said composition further contains from 10 to 250 phr of a filler selected from the group consisting of silica, carbon black and mixtures thereof.

7. The pneumatic tire of claim 1 wherein said tire is selected from the group consisting of passenger tires, motorcycle tires, aircraft tires, agricultural, earthmover, off-the-road and truck tires.

8. The pneumatic tire of claim 1 where said tire is a radial.

9. The pneumatic tire of claim 1 wherein said rubber component is selected form the group consisting of a tread cap, tread base, sidewall, innerliner, apex, chafer, sidewall insert, wirecoat and ply coat.

10. The pneumatic tire of claim 1 wherein said rubber component is a tread cap or tread base.

11. The pneumatic tire of claim 1 wherein said sulfur containing organosilicon compound comprises 3,3'-bis (triethoxysilylpropyl)tetrasulfide.

12. The pneumatic tire of claim 1 wherein said cyclodextrin is present in an amount ranging from 8 to 45 phr.

13. The pneumatic tire of claim 1, wherein said rubber component further comprises from 20 to 100 phr of silica.

14. A pneumatic tire having a rubber component where the rubber composition in said component is comprised of
    (A) 100 parts by weight of at least one olefinically unsaturated rubber;
    (B) 8 to 45 phr of a cyclodextrin compound;
    (C) 20 to 100 phr of silica; and
    (D) 0.5 to 20 phr of a sulfur containing organosilicon compound of the formula:

in which Z is selected from the group consisting of

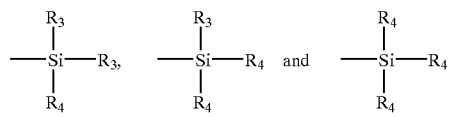

where $R_3$ is an alkyl group of 1 to 4 carbon atoms, cyclohexyl or phenyl; $R_4$ is alkoxy of 1 to 8 carbon atoms, or cycloalkoxy of 5 to 8 carbon atoms; Alk is a divalent hydrocarbon of 1 to 18 carbon atoms and n is an integer from 2 to 8.

15. The pneumatic tire of claim 14 wherein said sulfur containing organosilicon compound comprises 3,3'-bis (triethoxysilylpropyl)tetrasulfide.

16. The pneumatic tire of claim 14 wherein the cyclodextrin compound comprises a cyclodextrin compound having at least one pendent moiety or substituent that renders the cyclodextrin compatible with the rubber.

17. The pneumatic tire of claim 14 wherein the cyclodextrin compound contains at least one substituent on a cyclodextrin primary carbon atom.

18. The pneumatic tire of claim 14 wherein the cyclodextrin comprises α-cyclodextrin, β-cyclodextrin, γ-cyclodextrin or mixtures thereof.

19. The pneumatic tire of claim 14 wherein said cyclodextrin compound is selected from the group consisting of acylated cyclodextrin, alkylated cyclodextrin, cyclodextrin esters, hydrocarbyl-amino cyclodextrin, alkyl phosphono cyclodextrin, alkyl phosphato cyclodextrin, imidazolyl substituted cyclodextrin, pyridine substituted cyclodextrin, hydrocarbyl sulfur containing functional groups cyclodextrin, silica-containing functional group substituted cyclodextrin, carbonate substituted cyclodextrin, carboxylic acid substituted cyclodextrin and mixtures thereof.

20. The pneumatic tire of claim 14 wherein said rubber component is a tread cap or tread base.

* * * * *